United States Patent [19]
Boyd, Jr. et al.

[11] 3,965,005

[45] June 22, 1976

[54] METHOD AND APPARATUS FOR EVAPORATING AND SEPARATING MULTIPLE COMPONENT SOLUTIONS OR MIXTURES

[75] Inventors: Lawrence C. Boyd, Jr.; Everett F. Kelm, both of Corning, N.Y.; John C. Randall, Blacksburg, Va.

[73] Assignee: Corning Glass Works, Corning, N.Y.

[22] Filed: Nov. 22, 1974

[21] Appl. No.: 526,215

[52] U.S. Cl. .............................. 210/96 R; 159/27 A; 159/31; 159/44; 202/200; 210/71; 210/73 R; 210/110; 210/182; 210/258
[51] Int. Cl.² ......................................... B01D 1/12
[58] Field of Search .............. 159/27 A, 31, 44, 47; 202/197, 200, 236, 237, 185; 203/40; 210/71, 73, 96, 110, 210/114, 152, 180, 181, 182, 258, 259

[56] References Cited
UNITED STATES PATENTS

| | | | |
|---|---|---|---|
| 1,436,739 | 11/1922 | Webre | 159/31 X |
| 1,883,379 | 10/1932 | Kermer | 159/27 A |
| 1,943,106 | 1/1934 | Burnham | 159/44 X |
| 2,199,320 | 4/1940 | Von Le Juge | 159/31 X |
| 2,628,168 | 2/1953 | Madsen | 159/44 |
| 2,745,484 | 5/1956 | Eckstrom et al | 159/44 |
| 2,768,813 | 10/1956 | Boyer | 159/27 A |
| 2,800,955 | 7/1957 | Honig et al | 159/44 X |
| 3,203,466 | 8/1965 | Eckstrom | 159/44 |
| 3,686,077 | 8/1972 | De Koning | 159/27 A |

FOREIGN PATENTS OR APPLICATIONS 57,888  1/1946  Netherlands..................... 159/27 A

*Primary Examiner*—Charles N. Hart
*Assistant Examiner*—Robert G. Mukai
*Attorney, Agent, or Firm*—Thomas J. McNaughton; Burton R. Turner; Clarence R. Patty, Jr.

[57] ABSTRACT

Apparatus for separating feed solution, such as chrome or nickel plating rinse solutions, into a concentrated liquor portion and a solvent portion, comprising vertical shell and tube evaporator means for generating a stream of vapor and entrained droplets; first impingement means for separating a first liquor portion from the stream; second impingement means for separating a second liquid portion from the stream; mesh entrainment pad means for separating a third liquor portion from the stream to form a stream consisting essentially of pure solvent vapor; reduced pressure generating means for drawing the stream from the evaporator tubes through the impingement and mesh entrainment pad; capacitance means for accumulating a preselected volume of the first, second, and third liquor portions above the lower end of the evaporator; and conduit means for recycling liquor from the capacitance means to the evaporator means. The apparatus includes a shell and tube evaporator and an especially efficient impingement member, and the process steps for operating said apparatus to separate feed solution into an essentially pure solvent such as distilled water and a liquor of a preselected concentration are described.

5 Claims, 3 Drawing Figures ic evaporators do not recover water; but rather the water evaporated from the rinse solution, together with any toxic liquid entrained therein, are lost to the atmosphere.

METHOD AND APPARATUS FOR EVAPORATING AND SEPARATING MULTIPLE COMPONENT SOLUTIONS OR MIXTURES

BACKGROUND OF THE INVENTION

1. Field of the Invention

This invention relates to method and apparatus for evaporating and separating a vaporizable component from a multiple component liquid, such as a solvent-solute liquid, and more particularly to method and apparatus utilizing vertical shell and tube evaporators in combination with mechanical separators for evaporating and separating vaporizable components from a multiple component liquid. The invention has specific application to water pollution control apparatus and method and in particular to method and apparatus for fractionating essentially pure water from solvent-solute, waste solutions or mixtures.

2. Prior Art

In recent years, the nickel and chrome plating industries have become increasingly concerned with compliance with ever-tightening environmental standards, rapidly escalating prices for plating chemicals and shortages of plating chemicals. Due to the environmental standards, plating rinse solutions can no longer be discharged into streams, but must either be destroyed (i.e. rendered non-toxic) or processed to recover portions thereof.

The destruction of plating rinse solution requires the use of costly destruct chemicals to convert toxic portions of the plating rinse solution into a disposable sludge. In that 50 to 90 percent of the plating chemicals are dragged out from the plating tank with the product to be plated and mixed with the rinse solution, the destruction of plating rinse pollutants not only involves the loss of costly destruct chemicals but also the loss of up to 90 percent of the expensive plating chemicals. Also, sludge-removal is becoming more difficult due to the declining number of land-fill sites for sludge disposal.

Accordingly, recovery methods and apparatus have been developed to recover plating chemicals or solutions from plating rinse solutions. Flash evaporators, such as that shown in U.S. Pat. Nos. 3,640,331 and 2,853,442, and ion exchangers, such as that shown in U.S. Pat. No. 3,681,212, have been used for this purpose.

However, known flash evaporators do not produce distilled water of a very high quality, that is, three parts per million (3 ppm) or less of plating metal; but rather the water separated from this type of recovery unit has a purity of 5 to 10 parts per million. Moreover, flash evaporators will not effectively handle solutions containing foaming agents. Also, this type of unit will recover nickel or chrome plating solutions of up to only 50 ounces per gallon. Finally, this unit is bulky and requires up to 80 square feet of floor space and up to 15 feet of ceiling height.

The ion exchange recovery unit will not handle nickel and will not produce a concentration of over 12 ounces per gallon.

Other known types of plating waste recovery units are submerged tube evaporators, atmospheric evaporators, and reverse osmosis systems. The lattermost will not handle chrome; and its recovery of nickel is limited to a maximum concentration of 12 ounces per gallon and to a solution which has little or no foaming agents. Atmospheric evaporators do not recover water; but rather the water evaporated from the rinse solution, together with any toxic liquid entrained therein, are lost to the atmosphere.

Accordingly, no prior known type of recovery unit satisfactorily meets the following requirements for completely effective recovery of plating solution and water: water purity of three parts per million or less of plating metal; recovery of either nickel or chrome plating solutions; capability of handling solutions containing foaming agents; capability of recovering nickel solutions of a concentration of up to 50 ounces per gallon and chrome solutions of 100 and 60 ounces per gallon; and compactness of design permitting use with limited available floor and headroom space.

A major object of this invention is to provide a recovery unit that will satisfy all of these requirements. Moreover, it is an object of this invention to provide a unit that performs reliably in producing essentially pure water and a plating solution of the desired concentration. It is also an object to provide a recovery unit which does not require frequent maintenance and which is relatively chemically durable, that is, which is capable of withstanding corrosion by metallic acid plating solutions.

Summary of the Invention

This invention provides for a method of separating essentially pure solvent such as distilled water and a concentrated solution from a feed solution comprising the steps of: supplying a feed solution or mixture to a plurality of vertical tubes; heating said feed solution in said vertical tubes to form a stream of vapor and entrained liquid droplets; flowing said stream from the top ends of said tubes into a dome-shaped vapor chamber to separate a first liquor portion from said stream; flowing the stream from said vapor chamber against a cylindrical surface to separate a second liquor portion from the stream; thereafter flowing the stream through a mesh entrainment separator to separate a third liquor portion from the stream, thereby forming a stream of essentially pure solvent vapor; flowing said first, second and third liquor portions into a liquor receiving chamber; and, flowing said liquor portions from said liquor chamber to mix said portions with said feed solution; and draining the liquor portions from said liquor chamber upon obtainment of a predetermined average concentration of said liquor portions.

Further, in order to provide for fully automatic operation, the method may include the additional steps of: continuously monitoring the average concentration of the liquor portions within said liquor receiving chamber; and draining the liquor portions within said chamber in accordance with said average concentration. More specifically, the following method may be used: maintaining the fluid within said liquor receiving chamber at a generally constant height or volume; and draining the fluid within said chamber in accordance with the hydraulic pressure exerted by all or a portion of said height or volume of fluid.

This invention also provides for an apparatus for separating a feed solution into a concentrated liquor portion and a solvent portion comprising, vertical shell and tube evaporator means for heating feed solution to form a plurality of streams of vapor and entrained liquor droplets in the upper ends of the tubes thereof; first impingement means positioned over the upper ends of said tubes for separating a first liquor portion from said streams, said first separator means including an outlet conduit preferably having a lowermost surface intersecting the impingement means below the upper ends of said tubes for discharging a combined stream from said first separator means; second impingement means communicating with said first impingement means outlet conduit for separating a second liquor portion from said stream; preferably, a mesh entrainment means for separating a third liquor portion from said stream; means for generating a reduced pressure to draw said stream through said first and second separator means and said mesh entrainment means and for removing said stream and said mesh entrainment mean; capacitance means including a liquor receiving chamber for accumulating a selected volume of said first, second and third liquor portions; recycling conduit means for flowing liquor portions from said capacitance means to said evaporator means; and drain valve means for selectively flowing liquor from said capacitance means, thereby providing liquor of a desired concentration.

The first impingement means may include a base portion adapted to be seated against the shell of said evaporator means; a cylindrical wall portion extending from said base portion; and, a hemispherical upper impingement portion projecting above said cylindrical portion, the inner surface of said upper portion providing the impingement surface for separating said first liquor portion from said stream. In order to provide for enhanced acceleration of the streams from the upper ends of the evaporator tubes and for minimal resuspension of separated liquor into said streams, the outlet conduit preferably has a diameter no less than the diameter of the cylindrical portion, and intersects with said impingement means below said hemispherical portion. Also, in order to direct the flow of separated liquor from said hemispherical portion down the side of the cylindrical portion which is away from the outlet conduit and into said liquor receiving portion, the axis of the outlet conduit may be oriented to extend substantially radially from said cylindrical portion, the second impingement means includes a vertical cylindrical surface and an inlet conduit, communicating with said first impingement means outlet conduit. The diameter of the second impingement means is greater than the diameter of the inlet conduit, thereby causing a de-acceleration of the combined stream exiting the inlet conduit. The inlet conduit preferably intersects the cylindrical surface to form an included angle between the axes of the conduit and the cylindrical surface of less than 90°. Also, to create a centrifugal or vortex flow of the stream within the separator, the axis of the conduit is aligned off-center with respect to the center-line of the cylindrical portion.

The apparatus includes feed solution flow control means for regulating the height or volume of liquor contained in the liquor receiving chamber. This control means may be comprised of a two position valve means for selectively permitting lower or higher flow rate of feed solution to the evaporator means and a fluid level sensing device for actuating the valve means in accordance with the fluid level in the liquor receiving chamber.

In order to provide for fully automatic operation, the apparatus may also include drain valve means for selectively discharging liquor from the capacitance means, and density or concentration sensing means for actuating said drain valve means in accordance with the density or concentration of the liquor to be drained. In a unit which includes said feed solution control means, the density sensing means may be comprised of a pressure sensing means for actuating the drain valve means in accordance with a pressure exerted by the liquor to be drained.

The invention includes shell and tube evaporator means, first impingement means, second impingement means, mesh entrainment separator means, vacuum generating means, and means for condensing the vapor stream exiting the mesh entrainment means. An apparatus comprising such elements may be used as a distillation unit for the purification, fractionation, or formation of new substances from multiple component solution or mixture containing a vaporizable component. Additionally such a unit may include a fluid spraying means for flushing entrained liquor from the mesh entrainment means.

DESCRIPTION OF THE PREFERRED EMBODIMENTS

Figure 1:
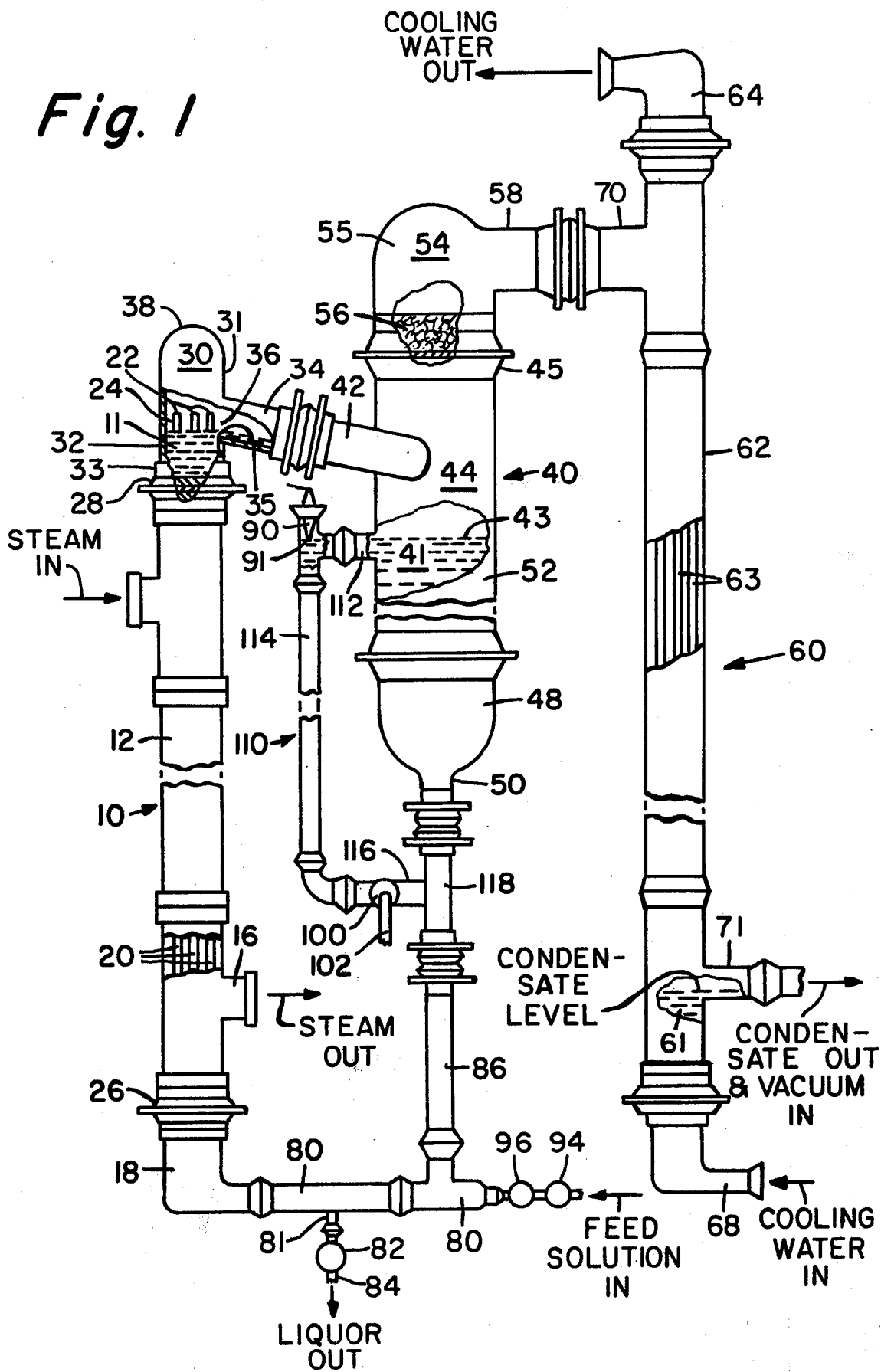
FIG. 1 is a side elevational schematic view of a preferred embodiment of the apparatus of the present invention and depicts, by partial sectional views, the structure and preferred fluid levels in various elements of the apparatus. It should be noted that suitable fasteners for fluid-tight connecting elements of the apparatus and a housing for supporting the elements in their respective positions are not illustrated.

Referring to FIG. 1, there is shown a portion of a chemical recovery unit in which a vaporizable solvent is separated from a chemical solution or mixture, thereby providing a concentrated chemical solution and an essentially pure solvent such as distilled water, both of which may be reutilized. The unit employs a vertical shell and tube evaporator 10 in combination with a cascade of impingement or separator means 30 and 40 and, optionally, mesh separator pad means 54 to separate feed fluid leaving the evaporator into a vaporized solvent and a concentrated solution. The unit may include condenser means 60 for condensing the vaporized solvent. The unit may also include a control system for mixing the concentrated solution with the feed fluid being supplied to evaporator 10 and for draining concentrated solution from the unit when the concentrated solution achieves a selected concentration or density. Not shown in FIG. 1 are means for generating a vacuum to draw vapor through the unit, means for supplying steam to evaporator 10, and means for supplying cooling water to the condensing means, as conventional means are utilized which are well known in the art. Also, although the unit is especially suited for recovering chemical plating solutions containing corrosive metallic acids or cyanide solutions from rinse solutions, plating tubs and wash or rinse tubs are not depicted in the drawings, since they form no part of the present invention.

The evaporator of the present unit is a vertical shell and tube type evaporator including a shell or jacket 12 and at least one tube 20, the number of tubes being dependent on the evaporation capacity requirements of the unit. At the lower end of evaporator 10 is a feed fluid receiving chamber 18 which is supplied with feed fluid or solution through conduit 80. At the upper end of shell 12 is a dome-shaped impingement means or impingement dome 30. Tube or tubes 20 are held within shell 12 by tube sheets 26 and 28, which provide a fluid-tight and pressure-tight seal against the tubes and the shell and thus define the upper extent of feed fluid chamber 18 and the lower extent of impingement means 30. To provide for the flow of stream through the shell to heat tubes 20, shell 12 is provided with an inlet port 14 and outlet port 16. Suitable valve means (not shown) are utilized to control the supply of steam to port 14.

The feed solution is initially drawn into tubes 20 by a partial vacuum supplied to impingement means 30 through an outlet conduit 34. The fluid is heated within tubes 20; and at a level several inches or more above the bottom ends of the tubes, the solution begins to boil. The vaporizable component or solvent portion, which may be water, is vaporized; and droplets of the feed solution become entrained in the vapor to form a vapor-liquid stream. This stream accelerates as vapor is formed and it is ejected from the upper end 22 of tubes 20.

Figure 2:
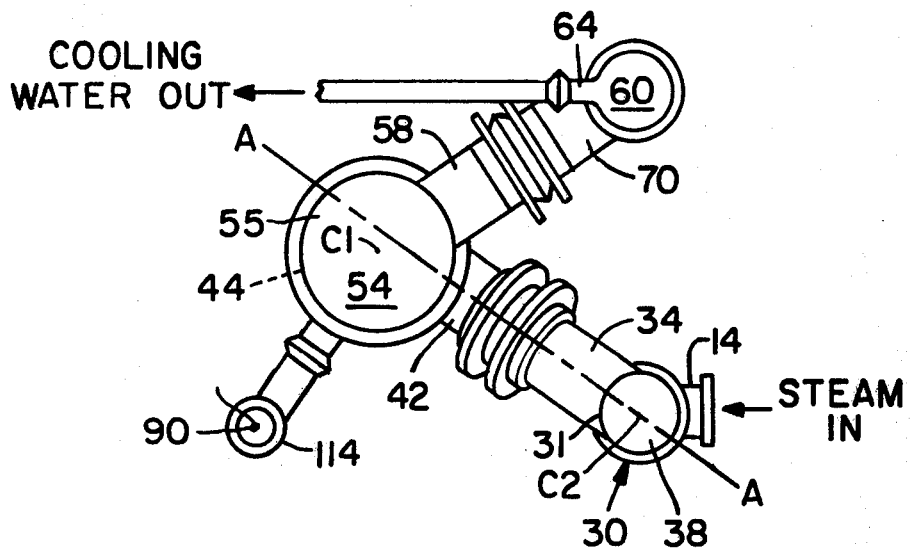
FIG. 2 is a top plan view of another preferred embodiment of the apparatus of this invention which depicts a compact arrangement of the elements thereof and, in particular shows a preferred orientation of the axis A—A of interconnected conduits communicating between the first and second impingement means relative to the centerlines C1 and C2 of the respective impingement means.

The first impingement means or impingement dome 30 of the present invention includes a base portion 33 adapted to form a fluid tight seal against the upper end of evaporator 10 (specifically, the upper tube sheet 28 of shell and tube evaporator 10), a cylindrical wall portion 31 extending from base portion 33, a closed impingement portion 38 extending above cylindrical portion 31, and an outlet duct 34 extending laterally from cylindrical portion 31. Preferably, impingement section 38 is generally hemispherical in shape. Also, to assure minimum resistance to and turbulence of flow of the stream of vapor and remaining entrained liquid from cylindrical portion 31, outlet conduit 34 is preferably cylindrical and no smaller in diameter than the diameter of cylindrical portion 31. Also, the axis A—A of outlet 34 is preferably aligned to intersect the center C2 of cylindrical portion 31 and impingement portion 38, so that outlet 34 extends radially of the cylindrical portion, as shown in FIG. 2. However, conduit 34 may be smaller or larger in diameter than cylindrical portion 31, and may intersect portion 31 at an off-center angle.

The vapor-liquid stream exiting tubes 20 strikes against impingement portion 38, thereby tending to separate liquid droplets entrained in the vapor from the stream. It has been found that a hemispherically shaped impingement portion is necessary for efficient operation in separating a substantial portion of the entrained fluid. The hemispherical shape, in conjunction with its spacing from the tube ends 22, reduces splash-back into the tubes, apparently imparts a rotational movement to the vapor-liquid stream thereby prolonging the impingement or contact of the streams, and tends to direct a majority of the liquid separating thereby to flow down to the bottom of the impingement means along that half of cylindrical portion 31 opposing outlet conduit 34.

The flow of a majority portion of separated fluid down that half of cylindrical wall 31 facing outlet 34 is beneficial in that less of the separated fluid is directed into an upper portion of outlet 34, where resuspension of the separated liquid may otherwise occur due to the velocity of the combined vapor-liquid stream exiting through the outlet. This flow pattern is partially illustrated in FIG. 3 wherein a relatively thick stream of separated fluid 11 is shown flowing downwardly along the wall of cylinder 31 opposite outlet 34. It should be noted that the peripheral position of stream 11 is not fixed, but rather moves peripherally from side to side generally along that half of the cylindrical surface facing outlet 34. Also, although not depicted in FIG. 3, a thin stream of separated fluid constantly or periodically flows down the remaining periphery of the inner surface of the cylindrical portion. Apparently, the location of the thick stream of fluid is effected by the flow of the vapor-liquid streams from a position overhead tube ends 22, as influenced by impingement dome 38, downwardly and outwardly with respect to outlet 34, and, thereafter, laterally into outlet 34 as shown by curved arrows in FIG. 3.

Preferably, tube ends 22 are positioned uniformly about the geometric center C1 of hemispherical impingement portion 38. Tube ends 22 may be arranged in a circle or concentric circles about center C1. Other regular shapes such as octagons, squares, triangles also may be used. However, it is not essential that tube ends be uniformly spaced, but may be clustered in a more or less random pattern.

The upper ends 22 of tubes 20 extend from tube sheet 28 above the lowest edge 35 of the juncture between outlet 34 and portion 31. As shown in FIG. 1, that portion of impingement means 30 below the lowest edge 35 of an opening 36 formed in cylindrical wall 31 at the intersection of conduit 34 and portion 31 constitutes a fluid receiving chamber 32. The fluid separated from the vapor-liquid stream, hereinafter referred to as a first liquid or liquor portion 11, accumulates in chamber 32, and then flows through outlet conduit 34. Although conduit 34 may be horizontal, it is preferred that the conduit intersect with impingement means 30 with a downward slope to cause the first fluid portion 11 to gravitationally flow downwardly along the bottom of conduit 34, with the vapor-liquid stream flowing thereabove.

It will be appreciated that the positioning of the upper ends 22 of the tubes 20 at a location above the lowermost edge 35 of the intersecting outlet conduit 34, i.e. above the fluid level in chamber 32, together with the utilization of the preferred inclined slope of the outlet means 34 and the preferred hemispherical shape of the impingement means 30, not only assure a substantial separation of the entrained fluid in the streams, but moreover assures that the first liquid portion 11 is separated after ejection from the tubes 20 at an impingement surface 38 removed from the outlet opening 36 of the separator and is flowed substantially away from the outlet opening to the fluid receiving chamber 32 under the upper ends 22 of the tubes. The separation above the outlet opening and the flow of the liquid below the upper end of the tubes not only inhibits the flow of liquor portion 11 back into tubes 20, but also assures a relatively unturbulent flow of vapor having only a small amount of entrained fluid through outlet conduit 34. Accordingly, a steadier application of partial vacuum to the tubes is obtainable. Since the boiling to evaporation temperatures of the feed solution depends on the pressure within tubes 20, a steadier and highly efficient boiling and evaporation of the feed solution is provided.

Figure 3:
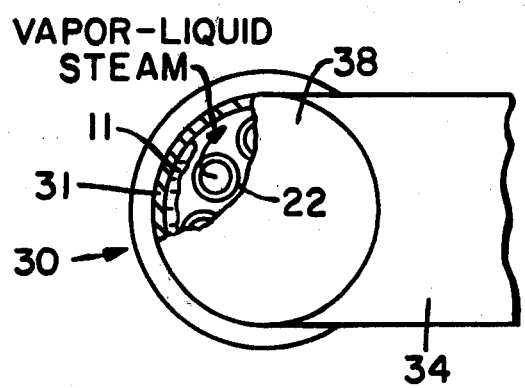
FIG. 3 is an enlarged top plan view partially in section of the impingement dome member or first impingement means illustrating the path of a vapor-liquid stream exiting the top end of an evaporator tube and the resulting location of a substantial portion of the separated liquor.

The combined vapor-liquid streams within conduit 34, hereinafter referred to as a single stream, may thereafter be directed into a second impingement means to further remove fluid droplets within the solvent vapor. As shown in FIGS. 1 and 3, the unit includes an impingement or separator pot means 40 having a cylindrical side wall portion 44 and an intake or inlet conduit 42 communicating between cylindrical portion 44 and outlet conduit 34 of first separator means 30. Preferably intake conduit 42 connects with wall portion 44 to cause a centrifugal flow of the vapor-liquid stream against the inner surface of the cylindrical wall portion 44; that is, as shown in FIG. 2, the axis A—A of conduit 42 is preferably oriented off-center with respect to center C1 of cylindrical wall portion 44, and as closely as practicable toward tangency with cylindrical wall 44. Also so as to direct the liquid entrained in the stream to flow or fall downwardly after impingement with wall 44, the axis of conduit 42 is shown slanting downwardly into separator 40, such that the axis of conduit 42 intersects a vertical plane through center line C1 with an upper angle of less than 90°.

Cylindrical portion 44 of separator pot 40 has a diameter greater than the diameter of conduit 42, thereby providing for expansion and deacceleration of the vapor portion of the vapor-liquid stream exiting conduit 42. As the vapor-liquid stream impinges wall 44, some of the entrained liquid separates from the stream, this portion of entrained liquid being designated a second liquid or liquor portion. The second liquor portion flow downwardly along wall portion 44, and the remaining vapor-liquid stream is drawn upwardly by means of a reduced pressure applied to an upper portion of separator 40.

The first liquid portion separated in impingement means 30 flows through conduit 34 into conduit 42 and thereafter down wall 44 to a lower portion of the separator pot 40, where it mixes with the second fluid portion.

The apparatus of the present invention may further include a mesh entrainment separator means 54, located above cylindrical portion 44, comprising a housing 55 connected in a vacuum tight relationship to the upper end 45 of cylindrical wall portion 44, and a mesh entrainment separator pad 56 secured in said housing 55. Housing 55 is shown having an outlet formed in a side thereof above pad 56. Mesh separator 56 may be a knitted plastic mesh pad (i.e. made from plastic fibers) a wire mesh pad coated with a plastic that is inert to the solution processed in the unit, or an uncoated metal mesh pad. Mesh separator pad 56 is highly porous and presents tortorous paths for the vapor-liquid stream to flow through. Mesh entrainment separator pads are well-known under the trade names, demister pads or mist eliminator pads.

Further entrained fluid, designated a third fluid portion, is removed from the rinsing vapor-liquid stream by the wires or fibers in pad 56 and flows or falls downwardly therefrom into the lower portion of separator pot 40 to mix with the first and second fluid portions. Mesh entrainment separator 54 may include a dome-shaped upper portion adapted to condense a slight amount of vapor from the vapor stream, thus forming droplets which fall downwardly into pad 56 and tend to wash down fluid entrained in the pad. However, the upper portion of housing 55 may comprise a right-angle or curved neck, or may have an outlet positioned directly overhead the demister pad. Since the vapor-liquid stream exiting pad 56 is essentially free from entrained fluid, (i.e., essentially pure vaporized solvent), it is not necessary that the upper portion of third separator means 54 perform an impingement function. If desired, suitable means for spraying pad 56 with a solvent may be provided above pad 56; such a spraying means could be used to assure that the third fluid portion is flushed from the pad. Also, when further separation by means of a mesh separator pad is not required, housing 55 alone may be used to direct the stream from separator pot 40.

In most cases, the user of the present recovery unit will prefer that the vaporized stream of essentially pure solvent be condensed, rather than being used for its heat value. Thus a condenser means may be connected to outlet 58. In order to minimize the floor space required for the unit, the condenser means may be in the form of a vertically oriented shell and tube condenser 60. Briefly, condenser 60 includes a shell 62, preferably made from glass, having a vapor inlet 70 and a condensate outlet 71, and tubes 63, preferably composed of metal, such as stainless steel. Cooling water is supplied to the lower end 68 of the condenser and exits at the upper end 64. Vapor condensate or solvent 61, such as distilled water, accumulates in the bottom of the shell, and flows through a lower portion of condensate outlet 71. The vacuum generating means for the unit is connected through outlet 71 to supply a partial vacuum or reduced pressure to the unit. A turbine type of liquid-ring vacuum pump may be used to generate the required reduced pressure and to remove the condensed solvent. However, a condensate conduit (not shown) having a suitable liquid trap or a receiver vessel (not shown) may be used to remove vapor condensate from outlet 71 and a vacuum line may be connected to outlet 71 to supply the reduced pressure to the unit.

When the unit is used to recover a concentrated liquor from the feed stream, the separated first, second and third fluid portions are preferably accumulated in a lower portion of separator pot 40, the lower end of which is situated at an elevation above that of evaporator feed chamber 18. Accordingly, cylindrical portion 44 of separator 40 may be extended downwardly to provide for a liquid or liquor receiving chamber 52 in a lower portion thereof. A separate bottom section 48 having an outlet 50 in the center thereof may be hermetically connected to the lower end of cylindrical portion 44 to define the lower portion of liquor receiving chamber 52. It should be noted that a separate fluid receiving chamber may be utilized; that is, separator 40 may be smaller (i.e. shallow) and a separate container (not shown) may be connected to the lower end of the smaller separator pot.

Outlet 50 of the concentrated liquid receiving chamber 52 may be either connected directly to feed solution conduit 80, or as shown in FIG. 1, may be indirectly connected thereto by means of a conduit 86, with or without a connector 118. The combined fluid portions, shown as liquor 41 in fluid receiving chamber 52 are mixed with incoming feed fluid or solution by means of connector 118 and conduits 86 and 80, and recycled through evaporator 10 to obtain a desired concentration. By virtue of the head or hydrodynamic pressure created by the fluid in chamber 52, which, as discussed below, may be maintained at a constant level by a fluid level control device, the mixed fluid solution recycled to the evaporator may be supplied thereto at an extremely constant and advantageously augmented pressure. This constant, augmented pressure enhances boiling and evaporation within tubes 20 and further provides for an increased vapor velocity within and from tubes 20 at a lower stream pressure. Further, the augmented pressure facilitates the utilization of less vacuum and/or shorter tube lengths, than would be required if the individual fluid portions, separated by the cascade of separator means, were not accumulated to provide for a substantial head in the recycle loop.

Also, the present invention completely eliminates the necessity for a pump to provide hydraulic force on the feed solution supplied on evaporator feed chamber 18 or on the fluid removed by the separator means. Such pumps not only are expensive, but, especially when used with metallic acid plating solution, require frequent cleaning and repair. In the case of plating operations, it has been found that the rinse solution from a rinse tub (not shown) can be made to flow to the unit simply by maintaining the feed chamber of the unit at a height lower than the bottom of the rinse tank which, in the usual case, is elevated up to seven feet above floor level.

In order to control the level of the fluid in the concentrated fluid or liquor receiving chamber 52, a suitable fluid sensing probe is situated in chamber 52 at the desired height; or as shown in FIG. 1, a vertical liquor-level control loop 110 may be connected to the liquor receiving chamber, with a liquor level sensing device or probe 90, such as a Warrick conductance probe, having a lower end 91 positioned at the desired level in the control loop 110. If a control loop is utilized in conjunction with an integral separator/fluid receiving chamber assembly, an intake or inlet 112 to the loop is positioned at or below the desired fluid level within the liquor receiving portion 52 of the assembly; and an outlet 116 to the loop may be connected to the interconnecting conduit 86 below or at the bottom of chamber 52. As shown in FIG. 1, a T-shaped connector 118 may be used to interconnect control loop 110, receiving chamber outlet 50, and interconnecting conduit 86.

The fluid level sensing device 90 is connected to a feed solution valve means for controlling the volume of feed solution fed to the evaporator feed chamber 18. A combination of a fluid level probe and a two-position valve may be used to control the level of fluid within receiving chamber 52. For example, the valve means may include a two-position valve 96, such as a Q.V.F. valve modified with a pneumatically actuated piston, which provides for a flow-through at one of two preselected flow rates, such as 1 or 2 gallons per minute. When the fluid level, or upper surface 43 of liquor 41 is below the probe 90, the valve means is actuated to permit the higher flow rate; but when the fluid level rises to contact the probe, the pneumatically operated two-position valve is activated by suitable relay means to allow flow at the lower rate, thus lowering the fluid level within chamber 52 since the recirculating flow therefrom is substantially constant for a given level. In order to stop flow of feed fluid, a separate on-off valve 94 may be in conjunction with the two-position valve.

It has been found that the most efficient processing or recovering of plating solutions normally requires many recycles through the unit to obtain a desired concentration. In other words, plating waste solutions are best concentrated not in a single pass through the evaporator, but in many pass-throughs. In operation, the concentration of the rinse solution, used as the feed solution, may be 1 ounce per gallon, and the target concentration of the final liquor may be 50 ounces per gallon. When supplied with about 8 to 12 psi of saturated steam and a reduced pressure of about 0.5 atmosphere, a nominal processing capacity for a unit having a capacitance of 10 gallons could be about 75 gallons per hour (depending mainly on the length, the heat transfer coefficient, and number of tubes 20); and the unit would require about 6.5 hours of operation before the 10 gallons of concentrated fluid in the unit would reach the target concentration, assuming the above concentrations. Thus it is possible, by rigidly adhering to predetermined operating parameters, to calculate how long the unit must be run before the feed solution has been sufficiently concentrated. Thereafter the concentrated fluid may be drained and distributed for use in plating operations.

A drain outlet 81 and valve means 82 may be connected to feed solution conduit 80 between interconnected conduit 86 and feed chamber 18. By stopping the flow of feed fluid by mean of valve 94, venting or turning off the vacuum supplied through conduit 71, and opening the drain valve 82, the concentrated solution may be drained from the liquor receiving chamber 52 through a drain conduit 84. Also, during the draining operation, the steam should not be supplied to inlet 14 of the evaporator.

In order to provide for fully automatic and fail-safe operation, the concentrated solution within the liquor receiving chamber may be continuously monitored; and depending on whether the concentrated solution is below or at its target concentration, the concentrated solution is either recycled or drained. Since the concentration of the solution is a function of its density, a control system for the unit may utilize this principle to provide a simple and reliable system for testing concentration of the concentrated solution in the fluid receiving chamber. Such a concentration sensing system may combine a pressure sensing device and an associated drain valve with the fluid level control system, described above.

Specifically, the aforementioned fluid or liquor level control system assures that the fluid level within the concentrated fluid receiving chamber will remain at approximately the level of the fluid sensing probe 90. A pressure sensing device 100 is positioned within control loop 110 and preferably at a level below the fluid chamber 52. Since the fluid in the chamber, and hence within control loop 110, is maintained at about the same height, the hydraulic pressure against the pressure sensing device will vary according to the density of the fluid thereabove, the volume of the fluid being generally constant. When the pressure reaches a selected level, the pressure sensing device actuates the following draining steps (not necessarily in sequence): the feed solution is stopped by valve means 94; the partial vacuum supplied to the unit by conduit 71 is either vented by a venting valve (not shown) or by turning off the vacuum generating means; the steam supply to inlet 14 of evaporator 10 is cut off by a suitable valve means (not shown); and drain valve means 82 is opened, thereby permitting the liquor in chamber 52 to flow through a drain conduit 84.

A differential pressure switch, such as a Stat-O-Ring differential pressure switch having a Teflon plastic diaphragm, may be used as the pressure sensing device 100. The diaphragm within the differential pressure switch is pressurized at one side by the concentrating fluid and at its opposite side by the pressure corresponding to the reduced pressure supplied to the unit, which may be communicated from the vicinity of condenser outlet 71 by means of suitable tubing 102, shown only in part, to the differential pressure switch. When the difference in pressure exceeds a preset level, the differential pressure switch will activate the aforementioned draining steps.

When plating solutions are processed by the unit the materials from which the evaporator portion are constructed are preferably designed to substantially reduce the possibility of galvanic corrosion of the tubes therein. The shell, the feed fluid chamber and the vapor head (impingement dome) of the evaporator may be made from glass. This construction permits the use of tubes made from metals without regard to their galvanic properties.

The unit described above will handle the following general plating solutions: conventional chrome, proprietary decorative chrome; plastic chrome etch; hard chrome; di-chromate conversion coatings; watts nickel; proprietary bright nickel; proprietary semi-bright nickel; copper (sulfate); and acid zinc. It will also recover cynanide solutions.

The unit may be constructed as a module requiring from 4 feet by 4 feet of floor space and 12½ feet of headroom to 1½ feet by 4 feet of floor space and 10 feet of headroom. The vacuum generating means and optional holding tanks will, of course, require additional room. The modules may be combined to handle greater volumes of solutions.

The disclosed apparatus is capable of recovering chrome solutions having a concentration of 160 ounces per gallon and nickel solutions having a concentration of 50 ounces per gallon. The purity of water recovered by the evaporator and separators of this unit is surprisingly high — the unit can constantly produce water having a plating metal content of only 3 parts per million or less. Also, the unit will handle solutions having a substantial amount of foaming agents; such agents are used to minimize mist contamination in the vicinity of heated plating solution.

The present invention also provides for a method of recovering extremely pure solvent and a liquor of a preselected concentration from a dilute feed solution or mixture comprising the following steps: supplying feed solution to vertical tubes and applying heat to the tubes to form a stream of vaporized solvent and entrained liquor droplets in upper portions of the tubes; flowing the stream from the upper end of the tube upwardly against an impingement surface to separate a first liquor portion of liquid entrained in said stream; flowing the stream through a conduit located below said impingement surface and simultaneously flowing said first liquor portion below the upper ends of said tubes into a liquor receiving chamber; flowing the stream from said conduit laterally against a generally cylindrical surface to separate a second liquor portion of entrained liquor from the stream and flowing said second liquor portion into said liquor receiving chamber; flowing the stream upwardly through a mesh entrainment separator to separate a third liquor portion from the stream and flowing said third liquor portion downwardly into said liquor receiving chamber; condensing the stream passed through said mesh entrainment separator to recover essentially pure solvent; regulating the supplying of feed solution to said tubes in accordance with the total volume of said first, second, and third liquor portions in said liquor receiving chamber; recycling the liquor portions within said liquor receiving chamber; and draining the liquor portions from said liquor receiving chamber in accordance with the average concentration of the liquor portions within said chamber.

It will be appreciated that the above method does not necessarily require continuous measurement of the concentration of the various fluid portions. As indicated above, the amount of steam supplied to heat the tubes to vaporize the solution therein, and the magnitude of the reduced pressure applied to flow the stream from the tubes and through the unit, may be carefully regulated; under these conditions, the concentration of the liquor will be dependent on the flow rate, the concentration of the feed solution, and the duration of recycling of the solution. Accordingly, the following additional steps may be employed to assure that the fluid drained from the liquor receiving chamber is of the desired concentration: regulating the reduced pressure supplied to the unit, the amount of heat applied to the tubes, and the flow rate of the feed solution in accordance with the concentration of the feed solution; and, continuing the recycling of liquor from the liquor chamber for a predetermined period of time; and, thereafter, draining the solution from the liquor chamber.

In order to provide for a method of recovering a liquor having a preselected concentration from a feed solution having a varying percentage of solvent (vaporizable component) therein, the following additional steps may be utilized: continuously sensing the average concentration of the liquor portions within said liquor receiving chamber; and, draining fluid portions from said chamber upon obtainment of a predetermined average concentration of said liquor portions.

The concentration of the liquor portions within the liquor receiving chamber may be sensed by, concurrently, maintaining a generally constant height or volume of liquor within the liquor receiving chamber, and sensing the pressure exerted by at least a portion of said constant height or volume of liquid.

In lieu of determining the average concentration of fluid within the liquor receiving chamber by measuring the concentration at a position within the liquor chamber, the average concentration may be determined with sufficient accuracy by measuring the concentration or density of the first liquor portion and extrapolating from this concentration the average concentration of the combined first, second, and third liquor portions. Accordingly, the method of the present invention may include a substep of determining the average density of the liquor portions within the liquor chamber in accordance with the concentration of first liquor portions.

It will be appreciated that the shell and tube evaporator 10 and the elongated dome-shaped impingement member 30 may be used alone or in conjunction with various other separators, either for concentration or distillation purposes. Of course, capacitance means, and the recycling conduit means and the fluid level and concentration control systems associated with the capacitance means, would not be required when the concentration of the separated liquor is not important; accordingly these elements are not necessary for normal distillation functions.

It will be understood that the embodiments of the apparatus of this invention may be employed in ways and forms different from the above-described embodiments of this invention without departing from the spirit and scope of the appended claims.

What is claimed is:

1. In combination with an evaporator system for separating vapor and liquor components from a multiple component liquid, including vertical shell and tube evaporator means for forming streams of vapor and entrained liquor from a multiple component liquid, said evaporator means having a feed chamber at a lower end thereof for receiving said multiple component liquid, first impingement means connected to an upper end of said evaporator means for separating a first liquor portion from said streams, second impingement means communicating laterally with said first impingement means for separating a second liquor portion from said streams, and conduit means for mixing said first and second liquor portions with the multiple component liquid supplied to said feed chamber of said evaporator means, the improvement which comprises, said second impingement means includes a separator pot having a vertical cylindrical surface provided with an opening connected to an inlet conduit, said inlet conduit communicating with said first impingement means and having a longitudinal axis off-set with respect to the axis of said cylindrical surface;

liquor receiving chamber means, communicating with said first and second impingement means and having an outlet positioned above said feed chamber, for receiving and accumulating a substantial combined volume of said first and second liquor portions, said chamber means being formed by a lower portion of said separator pot, said separator pot having a closed lower section connected to said cylindrical surface and an outlet in said closed section connected to said conduit means;

means for supplying reduced pressure to said second impingement means and for removing said streams from said second impingement means;

mesh entrainment means for separating a third liquor portion from said streams, said mesh entrainment means comprising a housing connected to the upper end of said vertical cylindrical surface, a mesh entrainment separator pad secured within said housing above the confines of said cylindrical surface, and means extending from said housing and connected to said means for supplying reduced pressure to said second impingement means for removing said streams from said second impingement means and thereby drawings said streams through said mesh entrainment separator pad and providing an essentially pure vapor portion; and, drain means for intermittently draining said chamber means, said drain means including probe means for sensing the level of liquor within said liquor receiving chamber means, valve means actuated by said probe means for regulating the supply of multiple component liquid to said evaporator feed chamber and for maintaining the upper surface level of said combined volume of liquor portions within said liquor receiving chamber means at a generally constant average height, and pressure sensitive means communicating with a lower portion of said liquor receiving chamber means for actuating the draining of said chamber means in response to the obtainment of a predetermined density of said combined volume of liquor portions, thereby providing a liquor component of a selected concentration.

2. The apparatus of claim 1 wherein said evaporator means includes tubes extending from the upper end thereof; and said first impingement means comprises an elongated dome-shaped impingement separator including a base portion connected to the upper end of said evaporator means, a cylindrical portion extending from said base portion and having an outlet opening, an impingement portion extending above said cylindrical portion, outlet conduit means depending laterally from said cylindrical portion at said outlet opening with the axis of said conduit means forming an angle of less than ninety degrees with the axis of said cylindrical portion for simultaneously flowing both first liquor portions and streams of vapor and entrained liquor from said first impingement means, and said outlet opening having a lowermost edge lying below the upper ends of the tubes of said evaporator means.

3. The apparatus of claim 1 wherein the axis of said inlet conduit to said second impingement means is downwardly inclined with respect to the axis of said cylindrical surface of said separator pot.

4. The apparatus of claim 1 further including means for condensing the streams drawn through said mesh entrainment separator pad.

5. In combination with an evaporator system for separating vapor and liquor components from a multiple component liquid, including vertical shell and tube evaporator means for forming streams of vapor and entrained liquor from a multiple component liquid, said evaporator means having a feed chamber at a lower end thereof for receiving said multiple component liquid, first impingement means connected to an upper end of said evaporator means for separating a first liquor portion from said streams, second impingement means communicating laterally with said first impingement means for separating a second liquor portion from said streams, and conduit means for mixing said first and second liquor portions with the multiple component liquid supplied to said feed chamber of said evaporator means, the improvement which comprises, liquor receiving chamber means, communicating with said first and second impingement means and having an outlet positioned above said feed chamber, for receiving and accumulating a substantial volume of said first and second liquor portions;

said conduit means being connected to said outlet of said chamber means;

means for supplying reduced pressure to said second impingement means and for removing said streams from said second impingement means, thereby providing a vapor component;

drain means for intermittently draining said chamber means in accordance with the density of the liquor therein; and, said drain means including a probe means for sensing the level of liquor within said liquor receiving chamber means, valve means actuated by said probe means for regulating the supply of multiple component liquid to said evaporator feed chamber and for maintaining the upper surface level of said combined volume of liquor portions within said liquor receiving chamber means at a generally constant average height, and pressure sensitive means communicating with a lower portion of said liquor receiving chamber means for actuating the draining of said chamber means in response to the obtainment of a predetermined density of said combined volume of liquor portions, thereby providing a liquor component of a selected concentration.

* * * * *

UNITED STATES PATENT OFFICE
CERTIFICATE OF CORRECTION

PATENT NO. : 3,965,005
DATED : June 22, 1976
INVENTOR(S) : Lawrence C. Boyd, Everett F. Kelm and John C. Randall It is certified that error appears in the above-identified patent and that said Letters Patent are hereby corrected as shown below:

Column 2, line 34, "liquid" should read --liquor--; Column 3, line 14 "mean;" should read --means;--; Column 3, line 29, "stream." should read --streams.--; Column 3, lines 36 and 37, "liquor" should read --liquid--; Column 5, line 67, "separating" should read --separated--; Column 7, line 38, "flow" should read --flows--; Column 7, line 64, "rinsing" should read --rising--; Column 13, line 57, "drawings" should read --drawing--; Column 14, line 62, "a" should be cancelled.

Signed and Sealed this

Nineteenth Day of October 1976

[SEAL]

Attest:

RUTH C. MASON
*Attesting Officer*

C. MARSHALL DANN
*Commissioner of Patents and Trademarks*